Nov. 24, 1953 S. DOBA, JR., ET AL 2,660,676

SIGNAL GENERATING DEVICE

Original Filed Oct. 8, 1947 5 Sheets-Sheet 1

INVENTORS S. DOBA, JR.
J. W. RIEKE
BY Hugh S. Wertz
ATTORNEY

INVENTORS S. DOBA, JR.
J. W. RIEKE
BY Hugh S. Wertz
ATTORNEY

Nov. 24, 1953 S. DOBA, JR., ET AL 2,660,676

SIGNAL GENERATING DEVICE

Original Filed Oct. 8, 1947 5 Sheets-Sheet 3

INVENTORS S. DOBA, JR.
J. W. RIEKE
BY Hugh S. Wertz
ATTORNEY

Nov. 24, 1953 S. DOBA, JR., ET AL 2,660,676

SIGNAL GENERATING DEVICE

Original Filed Oct. 8, 1947 5 Sheets-Sheet 4

INVENTORS S. DOBA, JR.
J. W. RIEKE
BY Hugh S. Wertz
ATTORNEY

INVENTORS S. DOBA, JR.
J. W. RIEKE
BY Hugh S. Wertz
ATTORNEY

Patented Nov. 24, 1953 2,660,676

UNITED STATES PATENT OFFICE 2,660,676

SIGNAL GENERATING DEVICE

Stephen Doba, Jr., Parsippany, and John W. Rieke, Basking Ridge, N. J., assignors to Bell Telephone Laboratories, Incorporated, New York, N. Y., a corporation of New York Original application October 8, 1947, Serial No. 778,660. Divided and this application February 15, 1950, Serial No. 144,306

4 Claims. (Cl. 250—36)

This invention relates to signal generators and more specifically to generators of signals which can be used, for example, in noise interference and signal compression tests of transmission systems. This application is a division of application Serial No. 778,660, filed October 8, 1947, now U. S. Patent 2,580,033, issued December 25, 1951.

It is an object of the invention to make possible rapid and comprehensive tests of broad band transmissions systems.

It is another object of the invention to produce a signal generator which can be used to determine the noise and compression characteristics of systems for the transmission of television or other signals having a relatively wide energy spectrum.

In a specific illustrative embodiment, a signal generator in accordance with the invention comprises a source of television blanking and synchronizing signals, a generator controlled by the horizontal blanking signals for producing picture signals varying from a minimum amplitude to a maximum amplitude in discrete steps during each line scanning period, a generator controlled by the vertical blanking signals for producing a signal varying from a maximum amplitude to a minimum amplitude in discrete steps during each frame scanning period, a switching amplifier for alternately transmitting the stepped waveform signals of the two generators at least once during each frame step, and modulators for combining the output of the switching wave generator with synchronizing and blanking signals to form a composite test signal.

The composite test signal may be passed through a transmission circuit to be tested and the resultant signal displayed as a picture upon a cathode ray monitoring oscilloscope. Transmission defects or irregularities appear as characteristic variations in the stepped brightness patterns of the test picture and the effect of noise at any brightness level is readily discernible.

It is an important feature of the invention that the test signal may be generated entirely by electronic means and that the necessary equipment may be constructed in a compact and easily portable fashion. Another feature of the invention is that a test television picture produced by the signal indicates the effect of noise at all brightness levels simultaneously. A further feature is that the compression effects at frame scanning frequency and at line scanning frequency can be indicated simultaneously. A still further feature is that the change in brightness levels of the test picture may be readily adjusted to occur either linearly or exponentially.

The invention will be more readily understood from the following description taken with the accompanying drawings forming a part thereof in which.

Figure 4:
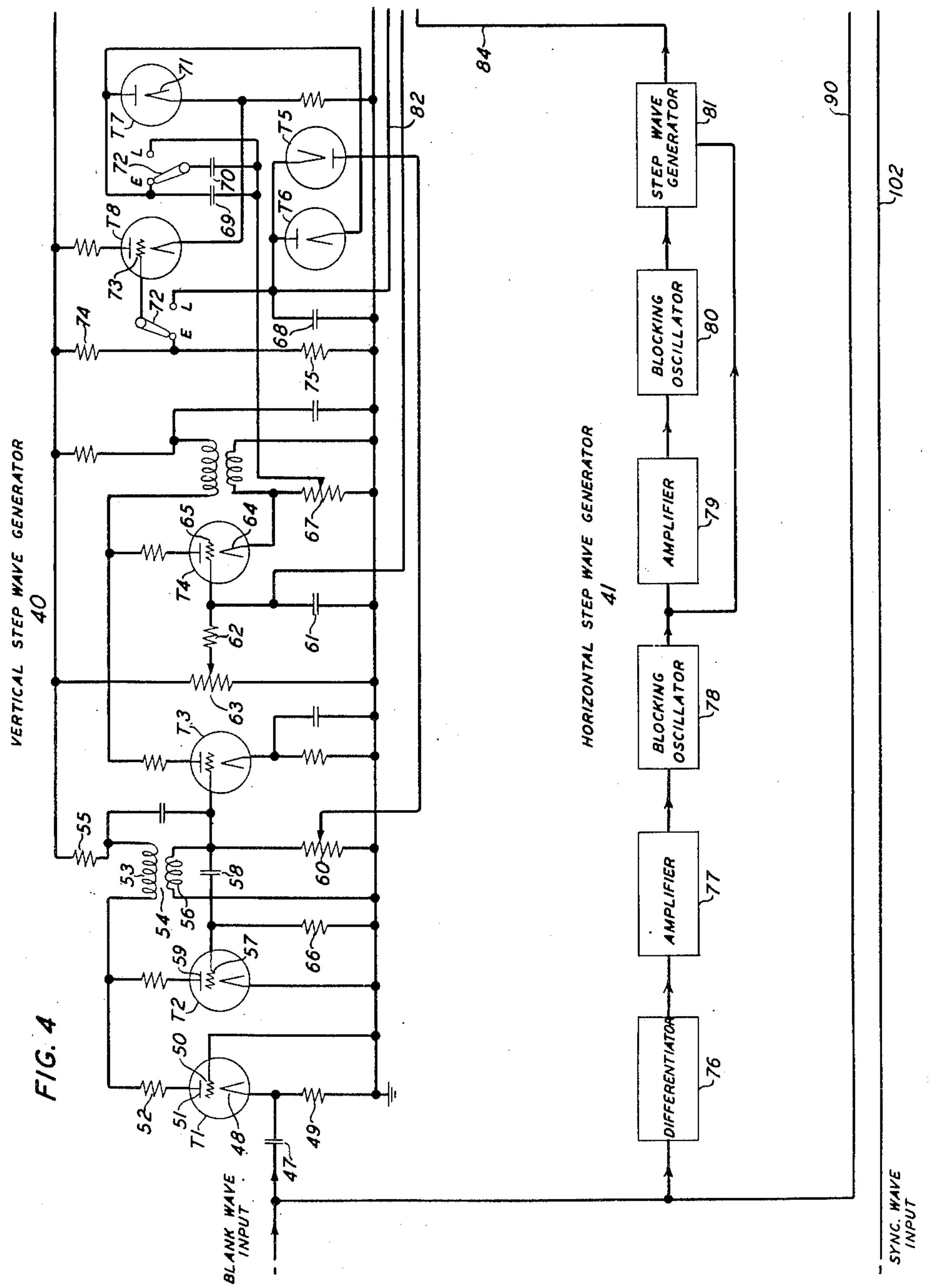
Figure 5:
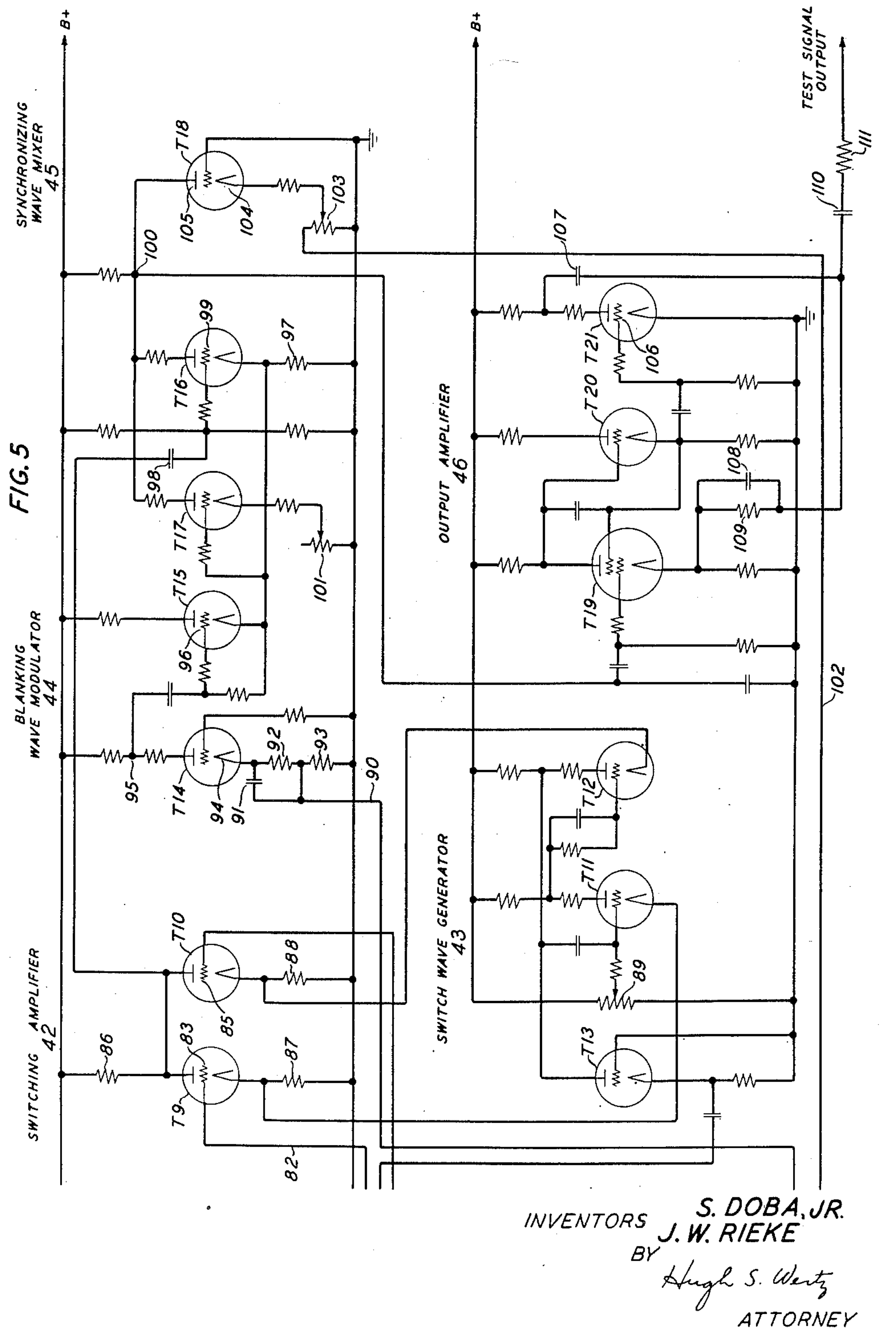
Figure 6:
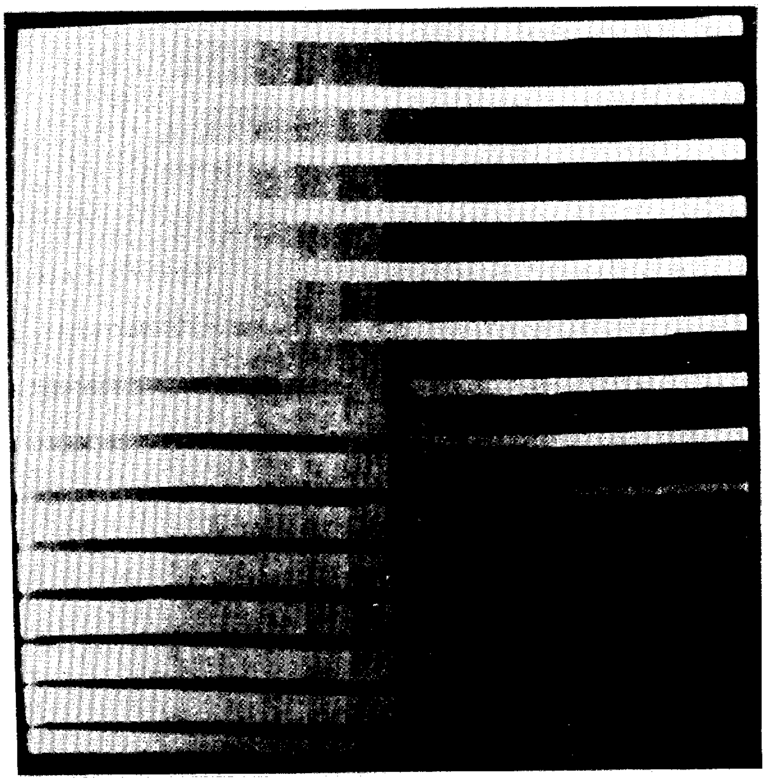

Fig. 4 and Fig. 5, when placed together with Fig. 4 at the left, show a schematic diagram of a useful specific embodiment of the test signal generator of the invention; and Fig. 6 shows a photograph of the picture formed by the test signal of the specific embodiment of Fig. 4 and Fig. 5.

Figures 1, 3:
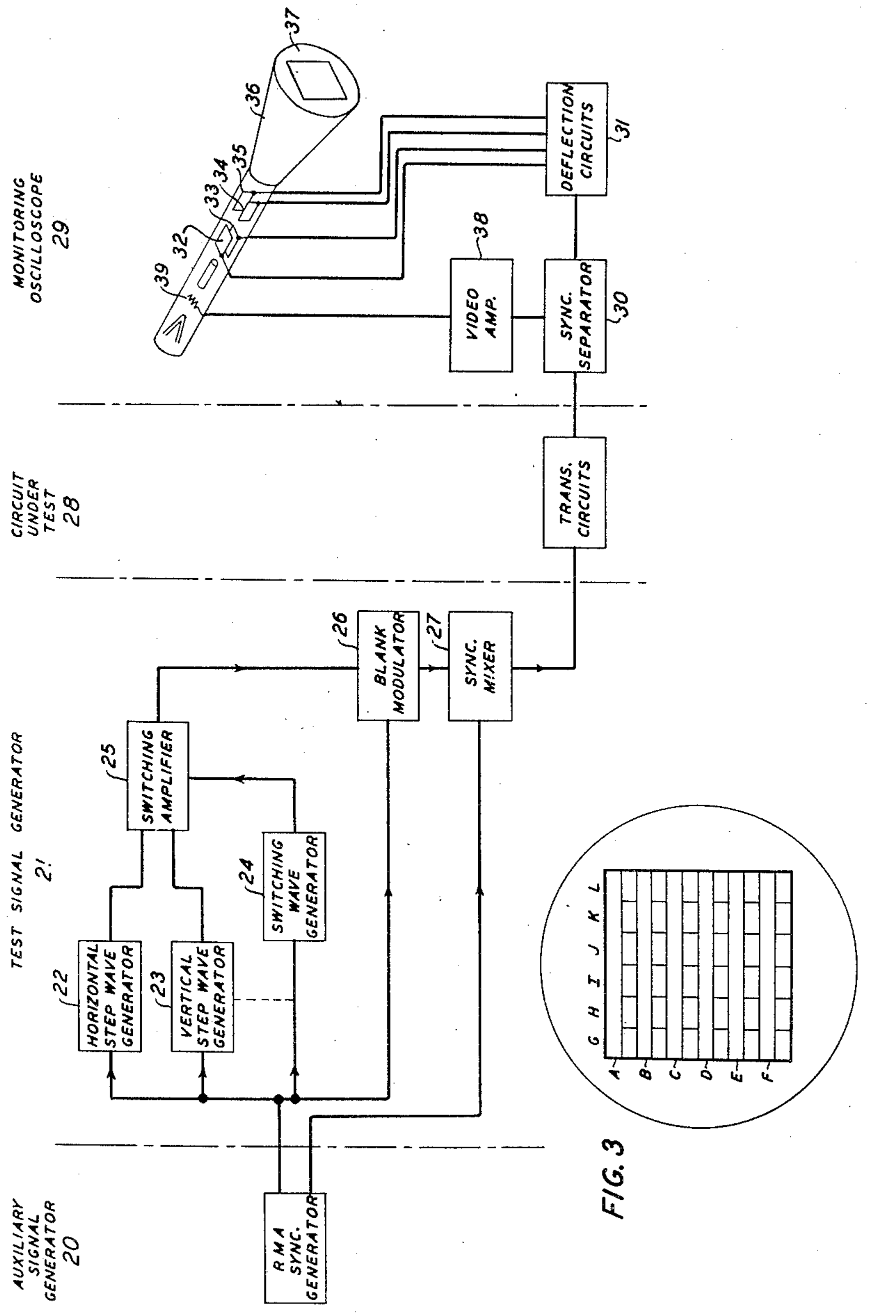
Fig. 1 is a simplified block diagram of a system including an illustrative embodiment of a signal generator in accordance with the invention.
Fig. 3 is a simplified representation of the picture formed on the face of a cathode ray monitor tube by the test signal.
Figure 2:
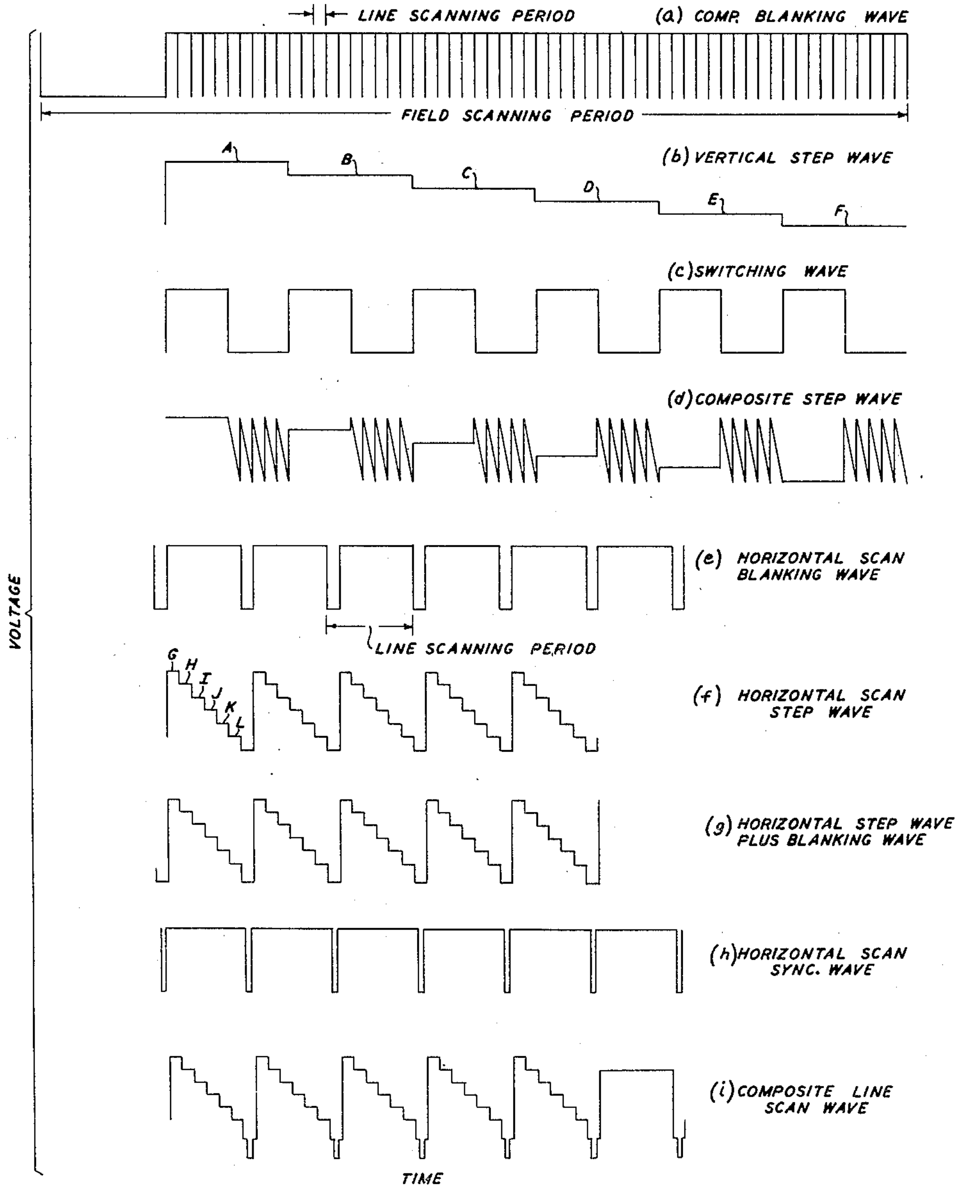
Fig. 2 shows the waveforms utilized in the illustrative embodiment of Fig. 1 in the production of a composite test signal.

Referring to Fig. 1, an auxiliary signal generator 20 supplies blanking and synchronizing signals to a test signal generator 21. The waveforms of the signals are shown in Fig. 2, in which Fig. 2(*a*) illustrates the composite blanking signal for a picture field having sixty horizontal scanning lines. Fig. 2(*e*) shows an expanded representation of the horizontal blanking signal for six line scanning periods and Fig. 2(*h*) shows the corresponding horizontal synchronizing signals. It is to be understood that the representations of the blanking and synchronizing signals shown in the drawing are simplified for the purposes of illustration and discussion and that in an application of the invention the scanning rates and waveforms of the signals would preferably be in accordance with RMA standards.

The blanking signals derived from the auxiliary signal generator are utilized in the test signal generator 21 to control the generation of the components of the test signal. A horizontal step wave generator 22 responsive to the horizontal scan blanking wave produces a signal which varies from maximum to minimum amplitude in discrete steps during a line scanning period as is shown in Fig. 2(*f*). Such a signal serves to form a picture line having graduated brightness levels, and hence contrast levels, varying from maximum to minimum brightness across the picture. Similarly, a vertical step wave generator 23 responsive to the vertical or frame blanking wave produces a signal which varies from maximum to minimum amplitude in discrete steps during a frame scanning period. The wave shown in Fig. 2(*b*) thus provides graduated brightness levels in which the variation from maximum to minimum brightness occurs at frame scanning rate.

A switching wave generator 24, which may be responsive to either the vertical blanking component of the blanking signal derived from the auxiliary signal generator 20 or the vertical step wave generator 23, generates a switching wave having a period preferably equal to the duration of one step of the vertical step wave as is shown in Fig. 2(*c*). The switching wave controls a switching wave amplifier 25 which alternately transmits the waves of Fig. 2(*b*) generated by the vertical step wave generator 23 and the waves of Fig. 2(*f*) generated by the horizontal step wave generator 22. For the illustrative waveforms shown there would thus be five horizontal scanning lines of the amplitude of the frame step wave followed by five horizontal scanning lines of stepped amplitude as is shown in Fig. 2(*d*). For purposes of simplified illustration the stepped amplitudes of the horizontal scanning lines are represented by the sloping sides on each of the pulses shown in the figure. The combined waves are then modulated by a blanking modulator 26 to superpose the blanking wave while the synchronizing signal is added by a synchronizing signal mixer 27. The resultant signal is a composite test signal of which Fig. 2(*i*) is representative of a group of six horizontal scanning lines.

The composite test signal is applied through a transmission circuit 28 under test to a monitoring oscilloscope 29. A separating circuit 30 separates the synchronizing components of the composite signal from the blanking and picture signals in accordance with techniques well known in the television art. The synchronizing signals control a deflection voltage generator 31 and the deflection voltages are applied to the deflection plates 32, 33, 34, and 35 of a cathode ray tube 36 to cause the electron beam to sweep out a raster upon a screen 37 in accordance with usual television practice. The blanking and picture signals are amplified by a wide band amplifier 38 and applied to a control grid 29 to intensity modulate the electron beam.

Referring now to Fig. 3, there is shown a simplified representation of the picture formed upon the screen 37 of the cathode ray tube 36 by the illustrative test signal of Fig. 2. The picture is composed of twelve horizontal strips corresponding to the groups of horizontal scanning lines alternately transmitted by the switching amplifier 25 of the test signal generator 21. Alternate groups of lines are of uniform brightness within each group but change in brightness from group to group. Thus the groups of lines designated by the letters A, B, C, D, E and F correspond in brightness level to the amplitudes of the steps A, B, C, D, E and F of the vertical scan step wave of Fig. 2(*b*), each group of lines being of a brightness level determined by the amplitude of the wave step.

The remainder of the groups of horizontal scanning lines are of stepped brightness level across the picture. Thus the letters G, H, I, J, K and L across the top of the picture of Fig. 3 represents the steps of brightness level corresponding to the steps in amplitude G, H, I, J, K and L of the horizontal scanning step wave of Fig. 2(*f*). Each group of lines decreases from a maximum brightness level at the left side of the picture, corresponding to a maximum signal amplitude G of Fig. 2(*f*), to a minimum brightness level at the right side of the picture, corresponding to a minimum signal amplitude L of Fig. 2(*f*).

It will thus be seen that the test picture produced by the invention may incorporate many brightness levels with the brightness level variation occurring simultaneously at frame scanning rate and at line scanning rate. The advantage of the invention will be further apparent from a consideration of the many possible adaptations of the method of the invention. Thus, the range of brightness level variation may be from black to white, or in any intermediate range. Further, the change in brightness from one step to the next may be uniform, thus providing a linear contrast function, or the change in brightness may be proportional to the brightness of the step, thus providing an exponential contract function. Finally, the number of steps or gradations of brightness may be readily controlled or adjusted in accordance with the type of test information desired.

Referring now to Figs. 4 and 5, there is shown a schematic diagram of a specific embodiment of the test signal generator of the invention. The illustrative embodiment performs essentially the same functions previously described in connection with the test signal generator 21 of Fig. 1 and is intended to be utilized in conjunction with an RMA synchronizing signal generator which will furnish positive blanking and synchronizing signals.

Briefly stated, the test signal generator includes a vertical step wave generator 40 for producing a wave varying in discrete steps from maximum to minimum amplitude during a frame scanning period, a horizontal step wave generator 41 for producing a wave varying in discrete steps from maximum to minimum amplitude during a line scanning period, a switching amplifier 42 for alternately transmitting the signals of the step wave generators 40 and 41, a switching wave generator 43 responsive to the vertical step wave generator 40 for controlling the switching amplifier 42, a blanking wave modulator 44 for modulating the combined step waves in accordance with standard blanking signals supplied by the synchronizing signal generator, a synchronizing wave mixer 45 for adding standard synchronizing signals, and an output amplifier 46 for providing a desirable output signal level and source impedance.

Proceeding now to a more detailed description of the test signal generator, the vertical step wave generator 40 is controlled by a composite blanking wave supplied by the external synchronizing signal generator. The blanking wave is applied through a coupling condenser 47 to a cathode 48 of a tube T1. The coupling condenser 47 in conjunction with a cathode register 49 has a time constant such that only the vertical or frame blanking wave of the composite blanking wave is differentiated. Thus, there is applied to the cathode 48 of tube T1 a series of positive pulses with the addition of a broad negative pulse at the cessation of the vertical or frame blanking wave. The control grid 50 of tube T1 is grounded while an anode 51 is connected through a plate coupling resistor 52, a primary winding 53 of a step-down transformer 54, and a common coupling resistor 55 to the positive pole of a source of high potential.

Tube T1 serves as a trigger tube for tube T2 which is arranged in a blocking oscillator circuit of a type well known in the art. Thus, as the cathode 48 of tube T1 is driven negative by the negative portion of the differentiated frame blanking wave, the current drawn by the anode 51 and tube T1, and hence through the primary winding 53 of the transformer 54, will tend to increase abruptly. A secondary 56 of the transformer 54 is so connected as to impress a positive potential pulse upon a control grid 57 and hence charge a grid condenser 58 during the period when the current through the primary of the transformer 56 is increasing. During this same period the current drawn by an anode 59 of tube T2 rapidly reaches the saturation point for the tube thus producing a further increase in the current through the primary of the transformer 56. As soon as the current flow has reached its maximum the potential across the secondary drops to zero, the charge of the condenser 58 drives the control grid 57 negative and the current drawn by the anode 59 decreases. As a result of the decreasing current, a negative potential is developed across the secondary 56 of the transformer 54 and tube T2 rapidly cuts off. There are thus formed across the potentiometer 60 connected across the secondary 56 of transformer 54 positive pulses of very short duration and coinciding in time with the trailing edges of the frame blanking waves.

The positive pulses formed by the circuit of tube T2 across the potentiometer 60 are utilized to drive tube T3 which acts as a plate-coupled trigger tube for a second blocking oscillator including tube T4. The circuit including tube T4 is a blocking oscillator of the same general type as that of tube T2 except that the circuit constants are so chosen that the oscillator is free-running and has a repetition rate greater than the driving pulses. Thus, the grid blocking condenser 61, resistor 62, and the active portion of potentiometer 63 have a time constant such that the condenser 61 discharges to the cut-off potential of the control grid 65 of tube T4 in only a fraction of the time between driving pulses whereas the time constant of condenser 58 and resistor 66 associated with tube T2 is greater than the period between driving pulses. The grid potentiometer 63 may be utilized to adjust the repetition rate of the oscillator and the oscillator output is taken from the circuit of the cathode 64 as negative pulses across the cathode potentiometer 67.

Tubes T5, T6, T7 and T8 combine to form a generator for the production of waves having an amplitude variation in discrete steps such as has heretofore been described in connection with Figs. 1 and 2. Briefly, the generator comprises a control condenser 68 which is charged by positive potential pulses derived from the blocking oscillator including tube T2 while negative potential pulses derived from the blocking oscillator including tube T4 serve to remove the charge in discrete quantities between the charging periods.

Proceeding now to a more detailed explanation of the above-mentioned generator, positive potential pulses having a repetition rate equal to frame scanning frequency are supplied from the potentiometer 60 through a charging diode T5 to the control condenser 68. Thus the condenser 68 will be charged to a potential level determined by the setting of the potentiometer 60 at the end of every frame blanking wave. During the periods between the arrival of the positive potential charging pulses, negative potential pulses derived from the potentiometer 67 are applied through the coupling condensers 69 and 70 and a diode T6 to the condenser 68. A blocking diode T7 connected to the negative pulse circuit intermediate the condensers 69 and 70 and the diode T6 has a cathode 71 maintained at a potential level higher than the peak potential level of the positive pulses so as to prevent conduction except during the period while the negative pulses are arriving. For the generation of step waves in which the amplitude levels change in accordance with an exponential function, switch 72 is set in the E position. The grid 73 of tube T8 then assumes a potential determined by the voltage divider resistors 74 and 75 and the potential of the cathode 71 remains fixed. Under such conditions the amount of charge removed from the control condenser 68 by a negative pulse will decrease for each successive pulse and the potential across the control condenser will approach exponentially a voltage equal to the difference between the potential of the cathode 71 of the blocking diode T7 and the potential level of the negative pulses. For the generation of step waves in which the amplitude levels change in accordance with a linear function, the switch 72 is set to the L position. The potential of the grid 73 of the tube T8 and hence the potential of the cathode 71 of the blocking diode T7 is then determined by the potential across the control condenser 68 and the amount of decrease in potential is the same for each negative pulse. Under such conditions the coupling condenser 70 is removed from the circuit in order to provide a greater capacity ratio between the control condenser 68 and the coupling condenser 69 and hence prevent the complete removal of the charge from the control condenser by three or four negative pulses. Fig. 2(b) is illustrative of the wave-form produced by the step wave generator when the switch 72 is adjusted for the generation of a linearly varying step wave.

A horizontal step wave generator 41 operates in the same general fashion as does the vertical step wave generator 40 to provide a wave in which the stepped amplitude variations occur at line scanning rate. Thus a differentiator 76 responsive to the line scan blanking waves provides negative pulses for the control of a trigger amplifier 77 and a blocking oscillator 78 which in turn generates short positive pulses having a repetition rate equal to line scanning frequency. A trigger amplifier 79 responsive to the positive pulses derived from the blocking oscillator 78, and a blocking oscillator 80 produce negative pulses having a repetition rate several times greater than line scanning frequency. The positive and negative potential pulses derived from the aforementioned blocking oscillators are combined in a step wave generator 81, similar in function to the generator comprising tubes T5, T6, T7 and T8, to produce a line scanning wave of stepped amplitude. Fig. 2(f) is illustrative of a linearly stepped line scanning wave.

A switching amplifier 42 comprising tubes T9 and T10 performs the function of alternately transmitting the stepped waves generated by the vertical step wave generator 40 and the horizontal step wave generator 41. The step wave varying at vertical or frame scanning frequency is applied from the control condenser 68 through a conductor 82 to a control grid 83 of tube T9 while the step wave varying at horizontal or line scanning frequency from the step wave generator 81 is applied through a conductor 84 to a control grid 85 of tube T10. Tubes T9 and T10 have a common plate coupling resistor 86 so that as the respective cathode potentials are alternately driven to a cut-off or non-conducting condition by a switching wave generator 43, the two step waves will alternately appear in the common plate circuit.

The switching wave generator 43 produces a switching wave of rectangular waveform such as that shown in Fig. 2(c) and having an oscillation period essentially equal to the duration of one step of the frame frequency step wave. The switching wave generator 43 includes tubes T11 and T12 connected in a multivibrator circuit of well-known type and a plate coupled trigger tube T13. Tubes T11 and T9 are connected to a common cathode resistor 87 while tubes T12 and T10 are connected to a common cathode resistor 88. Hence, as tubes T11 and T12 become alternately conducting and non-conducting in the oscillation cycle of the multivibrator the variations in cathode potential of tubes T9 and T10 cause those tubes to become alternately conducting and non-conducting in a similar fashion. The trigger tube T13 is responsive to positive pulses derived from the grid condenser 61 of tube T4 and serves to synchronize the oscillation of the multivibrator at the time of change in the amplitude of the vertical step wave. Thus, the switching process is started at the beginning of each period of constant vertical step amplitude and then operates freely to return at some time near the middle of a vertical step period. The time at which this free running return occurs may be determined by the adjustment of a grid potentiometer 89.

The composite step wave appearing at the common plate circuit of tubes T9 and T10 is modulated in accordance with the standard blanking by a blanking wave modulator 44. The blanking signals are supplied from an external source and impressed through a conductor 90 and a coupling network comprising a condenser 91 and cathode resistors 92 and 93 upon a cathode 94 of tube T14. Potential variations appearing in the plate circuit 95 of tube T14 are applied to a grid 96 of tube T15 which is coupled to tube T16 by means of a common cathode resistor 97. The composite step wave derived from the switching amplifier 42 is applied through a coupling condenser 98 to a control grid 99 of tube T16 so that the signal appearing in the common plate circuit 100 of tubes T16, T17 and T18 is a combined step wave and blanking wave. Tube T17 is connected as a degenerative amplifier to produce a blanking wave in the common plate circuit 100 in reverse phase to that produced in the common cathode resistor 97 by the tube T15. Thus, the amplitude of the blanking wave which is mixed with the composite step wave may be controlled by adjustment of the cathode potentiometer 101.

Synchronizing signals are added to the blanking wave modulated composite step wave by a synchronizing wave mixer 45. The synchronizing signals are supplied from an external source through a conductor 102 and a cathode potentiometer 103 to a cathode 104 of tube T18. A plate 105 of tube T18 is connected to the common plate circuit 100 so that potential variations at that point will be further varied in accordance with the synchronizing waves. The cathode potentiometer 103 serves to adjust the amplitude of the impressed synchronizing waves.

It will be apparent that the potential variations in the common plate circuit 100 will be a composite of the step waves, blanking waves, and synchronizing waves. Fig. 2(i) is representative of a series of horizontal scanning lines of such a composite wave.

The composite test signal appearing at the common plate circuit 100 of tube T16, T17 and T18 is amplified by an output amplifier 46. In the output amplifier 46, tubes T19 and T20 comprise a voltage amplifier which serves to impress a sufficient signal voltage upon a control grid 106 of the final amplifier tube T21. In order to provide a more uniform amplification over a wide frequency range, stabilize the frequency characteristic, and provide a low output impedance in the output amplifier, a portion of the output voltage of tube T21 is impressed through the network comprising condensers 107 and 108, and resistor 109 upon the cathode circuit of tube T19. The amplified test signal is applied to the circuits to be tested through a condenser 110 and an impedance matching resistor 111.

There is shown in Fig. 6 a photograph of a picture produced upon the face of a cathode ray monitor tube when the signal of the signal generator of the invention is utilized in practice. The results shown were obtained in the utilization of the embodiment of the test signal generator shown in Figs. 4 and 5 arranged to produce a standard RMA signal waveform of 525 lines per frame. It will be noted that fifteen steps or brightness levels are utilized both in the horizontal scanning lines and in the groups of lines having a brightness variation at frame scanning rate. Such a number of steps has been found to adequately indicate noise and compression effects at brightness levels from black to white in television transmission systems.

It is to be understood that while the invention has been described primarily in connection with the testing of transmission circuits for black and white television systems, it is by no means limited to such use. Thus the invention may be useful not only for the testing of multi-color television systems, but, generally for the testing of circuits intended to be utilized for the transmission of signals having a wide frequency spectrum.

What is claimed is:

1. In a television signal generator, means for generating a blanking signal, means for generating a synchronizing signal, means for generating from said blanking signal a vertical step wave having constant amplitude during a period less than a field scanning period but varying in amplitude by discrete steps during each field scanning period, means for generating from said blanking signal a horizontal scan step wave of line scanning period varying in amplitude by discrete steps during each line scanning period, and means for combining in predetermined sequence said vertical step wave and said horizontal scan step wave with said blanking signal and with said synchronizing signal to produce a composite test signal.

2. In a television signal generator, means for generating a blanking signal, means for generating a synchronizing signal, means for generating from said blanking signal pulses separated by a line scanning period, means for generating from said pulses a vertical step wave having constant amplitude for each two line scanning periods but varying in amplitude by discrete steps during each field scanning period, means for generating from said blanking signal gate pulses separated by less than a line scanning period, means for generating from said gate pulses a horizontal scan step wave of line scanning period and varying in amplitude by discrete steps during each line scanning period, and means for combining alternately said vertical step wave and said horizontal scan step wave with said blanking signal and said synchronizing signal to produce a composite test signal.

3. In a television signal generator, means for generating a blanking signal, means for generating a synchronizing signal, means for generating from said blanking signal a vertical step wave characterized by constant amplitude during a period less than a field scanning period but varying linearly in amplitude by discrete steps during each field scanning period, means for generating from said blanking signal a horizontal scan step wave of line scanning period linearly varying in amplitude by discrete steps during each line scanning period, and means for combining alternately said vertical step wave and said horizontal scan step wave with said blanking signal and said synchronizing signal to form a composite test signal.

4. In a television signal generator, means for generating a blanking signal, means for generating a synchronizing signal, means for generating from said blanking signal a vertical step wave characterized by constant amplitude during a period less than a field scanning period but varying exponentially in amplitude by discrete steps during each field scanning period, means for generating from said blanking signal a horizontal scan step wave of line scanning period exponentially varying in amplitude by discrete steps during each line scanning period, and means for combining alternately said vertical step wave and said horizontal scan step wave with said blanking signal and said synchronizing signal to form a composite test signal.

STEPHEN DOBA, Jr.
JOHN W. RIEKE.

References Cited in the file of this patent

UNITED STATES PATENTS

| Number | Name | Date |
|---|---|---|
| 1,706,538 | Mertz | Mar. 26, 1929 |
| 2,292,045 | Burnett | Aug. 4, 1942 |
| 2,352,488 | Mayle | June 27, 1944 |
| 2,411,648 | Brauer et al. | Nov. 26, 1946 |
| 2,444,036 | Crost | June 29, 1948 |
| 2,515,613 | Schoenfeld | July 18, 1950 |
| 2,525,102 | Schade | Oct. 10, 1950 |
| 2,570,775 | De Baun | Oct. 9, 1951 |

OTHER REFERENCES

R. C. A. Review, volume VI, No. 2, October 1941.